(No Model.)
A. J. THEIRING.
AXLE BEARING.
No. 570,111. Patented Oct. 27, 1896.
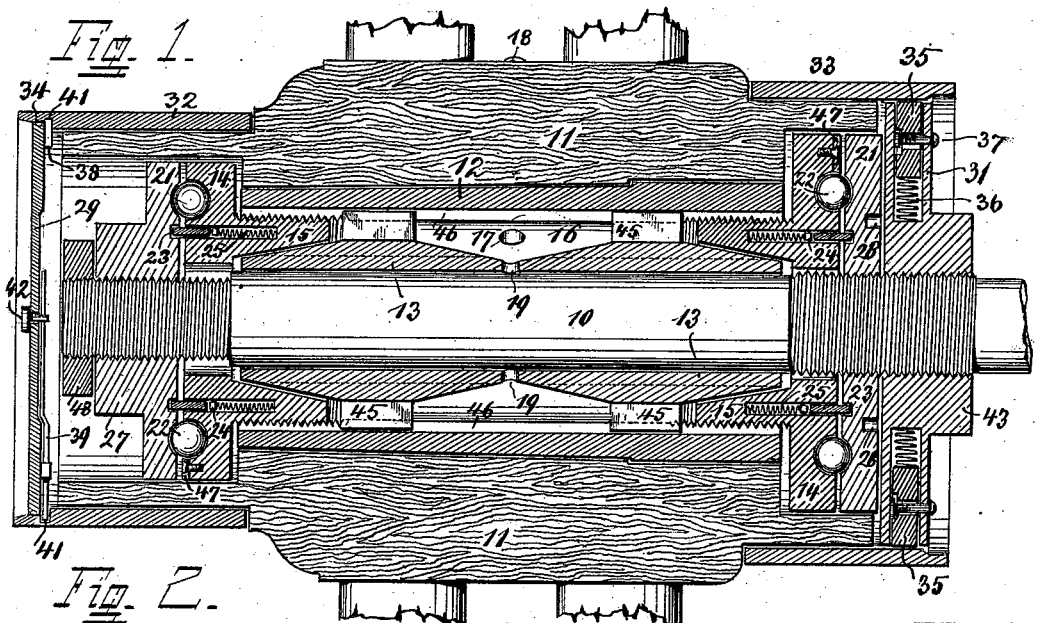
Attest
Edward W. Plum
Arthur A. Kline
Inventor
Andrew J. Theiring
by C. Spengel Atty.

UNITED STATES PATENT OFFICE.

ANDREW J. THEIRING, OF CINCINNATI, OHIO.

AXLE-BEARING.

SPECIFICATION forming part of Letters Patent No. 570,111, dated October 27, 1896.

Application filed March 2, 1896. Serial No. 581,427. (No model.)

*To all whom it may concern:*

Be it known that I, ANDREW J. THEIRING, a citizen of the United States, and a resident of Cincinnati, Hamilton county, State of Ohio, have invented certain new and useful Improvements in Axle-Bearings; and I do declare the following to be a full, clear, and exact description of the invention, such as will enable others skilled in the art to which it appertains to make and use the same, attention being called to the accompanying drawings, with the reference-numerals marked thereon, which form a part of this specification.

This invention relates to improvements in axle-bearings and hubs of wheels for wagons and similar vehicles of the heavier kind.

The features of this invention consist of certain details of construction particularly relating to means for taking up wear in the bearings and for obtaining a perfect lubrication, all of which is described in the following specification, and particularly pointed out in the claims at the end thereof. They are also illustrated in the accompanying drawings, in which—

Figure 1 is a longitudinal section through the hub and all parts of the axle-bearing. Fig. 2 is a front view of the hub with the outer dust-cap and disk 21 back of it removed. Fig. 3 is an elevation of such disk, showing it as it appears on its inner surface. Fig. 4 is a cross-section through the hub about midway between its ends. Fig. 5 is an outside view of the disk shown in Fig. 3. Fig. 6 is an end view of the adjustable sleeve detached, which forms the axle-bearing.

10 indicates the journal of the axle, that is, that part thereof about which the hub turns. This latter is longitudinally perforated and lined with a box 12, secured therein. The bore of this box is considerably larger than the axle-journal, which for this reason finds no bearing within the former. Such bearing is, however, supplied by a sleeve 13, of soft metal and longitudinally divided, the combined bore, one-half contained in each section, fitting closely around the axle-journal. This sectional sleeve, the ends of which are tapering, is held in position by disks 14, one at each end, and each provided with an inwardly-extending collar 15, which fits snugly over and around the tapering ends of the sleeve. These disks 14 with collars 15 are held in place by the latter, which are screwed into the ends of box 12, the two engaging parts being correspondingly threaded.

The sectional sleeve does not completely fit the space between the axle-journal and box 12, the unoccupied space between it and the latter forming an oil-chamber 16, the capacity of which is increased by reducing the thickness of the metal of the sleeve between its ends. The oil is introduced through one of two ducts 17, the two of which should, however, be open during filling to permit escape of air displaced by the oil. After filling, these ducts are kept closed by screw-caps 18. The oil is admitted in between the axle-journal and its bearing at the inner surface of the sleeve by passages 19 in the latter. The open ends of this oil-chamber are kept closed by disks 21, which are mounted and screwed upon the axle at the ends of its bearings and against the outside of each one of disks 14. They also determine the lateral position of the wheel on its axle with reference to the vehicle-body by confining the hub of it between them, permitting adjustment for the purpose of causing all wheels to track. These disks being stationary with reference to disks 14, which rotate with the wheel, it is preferable to reduce friction between their opposing surfaces as much as possible by limiting the contact between them and by obtaining it through the intervention of balls 22, placed between the two disks and carried in a groove by one of them.

The slight space which the interposing of the ball-bearings causes between the opposing disks is closed against the oil by suitable packing 23, carried in a groove in one of the disks and supported on rings 24 therein. It is held out and in contact against the opposite disk by being pressed into a groove in the latter by springs 25 back of rings 24, which also compensate for the wear of the packing. On account of any possible disturbance to these springs it is desirable that this packing or, at least, rings 24 do not rotate with reference to the disk by which they are carried. This is therefore prevented by having at one or more points, as at 26, the groove which carries these parts widened and the rings 24 extended into this enlarged part.

The disk at the outer end of the hub has a nut 27 on its outside, while the disk at the inner end is provided with holes 28 for insertion of a spanner-wrench to permit their attachment and removal.

As will be seen, perfect and constant lubrication may be maintained, and the lubricant is confined in a closed chamber, which prevents waste of oil and obviates frequent replenishing. The space beyond disks 21 is closed by two dust-caps 29 and 31, the former fitted inside of the outer hub-band 32, the other within the inner hub-band 33. Around their outer edges these dust-caps are provided with packing 34 and 35, the one of the inner dust-cap being in sections and pressed outwardly by springs 36, back of them. To prevent this sectional packing from dropping out when the dust-cap is removed, screws 37 are provided, which pass through the dust-cap, taking in also the packing. The openings in the dust-cap through which these screws pass is sufficiently enlarged so as to prevent these latter from interfering with the action of the springs. Dust-cap 29 is held in place by a projection 38 and latch 39, both engaging with a groove 41 in the inner surface of the outer hub-band. The latch is operated from the outside by a knob 42. The inner dust-cap 31 is screwed onto the axle, the screw-thread on the latter, which takes disk 21, being extended for such purpose.

A nut 43 is formed on the outside of dust-cap 31 to permit its manipulation. These dust-caps prevent dust and water from getting inside, particularly between the ball-bearings thereat. Lock-nuts are provided beyond all parts of the axle-bearing and on the outside of disks 21. Dust-cap 31 serves as one at the inner end, while a separate one, 48, is used at the outer end. If at any time the axle begins to wear loose, such wear is readily taken up by tightening disks 14 against the tapering ends of the sleeve, whereby the sections of the latter are drawn together and pressed against the axle-journal. When the wear has increased so as to prevent the sleeve-sections from coming together, it is necessary that a part of the metal at the joints where the sections meet be removed. For such purpose the sectional sleeve is taken out of box 12, which may be readily done after the disks at the ends are removed. Inasmuch as such reductions, due to consecutive adjustments, cause the sleeve-sections to lose their true semicircular shape, preventing them from lying snugly around the axle-journal, longitudinal cuts 44 are provided on the outside of the sleeve-sections, whereby the metal is sufficiently weakened to yield when disks 14 14 are screwed home, and enables them to force the sleeve to a close contact around the axle.

Rotation of the hub with box 12 and collars 15 around the outside of sleeve 13 is prevented by lugs 45 on the latter, which occupy positions in grooves 46 in the box. They permit longitudinal disengagement of the parts, but otherwise cause the two to move together and thereby confine all the wear on the sleeve to its inner surface, which is in contact with the axle-journal. To prevent the balls from dropping out of their grooves when the opposing disks are separated for any purpose, those grooves which contain them are of a depth which receives a part of the ball larger than half. To admit the balls, these grooves are enlarged at one point, which enlargement is closed by a plate 47, screwed against the disk after the balls are in place.

As will be observed, some of the features shown and described may be used independently from the others, which applies particularly to the form of sleeve, form of ball-bearings, and dust-caps.

Having described my invention, I claim as new—

1. In an improved axle-bearing, the combination of a box 12 having a straight bore, a sectional sleeve bored to receive the axle and having tapering ends, collars engaging with the interior of box 12 and the tapering ends of sleeve 13, thereby sustaining the latter in position within box 12 and disks 21 adjustably mounted on the axle at each end of the axle-bearing, confining box 12 with the sleeve between them.

2. In an improved axle-bearing, the combination of a box 12 having a straight bore, a sectional sleeve bored to receive the axle and having tapering ends, collars engaging with the interior of box 12 and the tapering ends of sleeve 13, thereby sustaining the latter in position within box 12, projections on one, engaging with depressions in the other whereby rotation of sleeve 13 within box 12 is prevented and disks 21 adjustably mounted on the axle at each end of the axle-bearing, confining box 12 with the sleeve between them.

3. In an improved axle-bearing, the combination of a box 12 having a straight bore, a sectional sleeve bored to receive the axle, having tapering ends, and longitudinal grooves 44 in its outside, collars adjustably secured within the interior of box 12 and surrounding the tapering ends of sleeve 13, thereby sustaining the latter in position within box 12 and permitting adjustment of its diameter.

4. In an improved axle-bearing, the combination of a box 12 having a straight bore, a sectional sleeve bored to receive the axle and having tapering ends, collars engaging with the interior of box 12 and the tapering ends of sleeve 13, thereby sustaining the latter in position within box 12, said box having grooves 46 and lugs 45 on sleeve 13 which reach into grooves 46 for the reasons specified.

5. In an improved axle-bearing, the combination of a box 12, a sectional sleeve bored to receive the axle and having tapering ends, collars engaging with the interior of box 12 and the tapering ends of sleeve 13 to hold the latter within box 12, the diameter of the former being less than the bore of the latter, thereby forming an oil-chamber 16 between the two, disks 21 at the ends of the axle-bearing to close endwise the space which forms the oil-chamber and there being openings and passages in box 12 and sleeve 13 to admit the oil to the oil-chamber and to the axle-bearing.

6. In an improved axle-bearing, the combination of a box 12, a sectional sleeve bored to receive the axle and having tapering ends, disks 14 with collars 15, each collar having a threaded exterior and a smooth interior, the exterior engaging the interior of box 12 and the interior engaging the tapering ends of sleeve 13, thereby holding the latter within box 12, the outside diameter of sleeve 13 being less than the bore of box 12 to form an oil-chamber 16 between the two, disks 21 at the ends of the axle-bearing to close endwise the space forming the oil-chamber and packing between the opposing disks to prevent the escape of oil.

7. In an improved axle-bearing, the combination of a box 12, a sectional sleeve bored to receive the axle and having tapering ends, disks 14 with collars 15 each collar having a threaded exterior and a smooth interior, the exterior engaging the interior of box 12 and the interior engaging the tapering ends of sleeve 13, thereby holding the latter within box 12, the outside diameter of sleeve 13 being less than the bore of box 12 to form an oil-chamber 16 between the two, disks 21 at the ends of the axle-bearing to close endwise the space forming the oil-chamber and balls between the opposing disks to limit the contact and reduce friction between them.

8. In an improved axle-bearing, the combination of a box 12, a sectional sleeve bored to receive the axle and having tapering ends, disks 14 with collars 15 each collar having a threaded exterior and a smooth interior, the exterior engaging the interior of box 12 and the interior engaging the tapering ends of sleeve 13, thereby holding the latter within box 12, the outside diameter of sleeve 13 being less than the bore of box 12 to form an oil-chamber 16 between the two, disks 21 at the ends of the axle-bearing to close endwise the space forming the oil-chamber, packing and balls between the opposing surfaces of the disks, the first to prevent the escape of oil and the latter to limit the contact between the disks and reduce friction between them.

9. In an improved axle-bearing, the combination of a box 12, a sectional sleeve bored to receive the axle and having tapering ends, disks 14 with collars 15 each collar having a threaded exterior and a smooth interior, the exterior engaging the interior of box 12 and the interior engaging the tapering ends of sleeve 13, thereby holding the latter within box 12, the outside diameter of sleeve 13 being less than the bore of box 12 to form an oil-chamber 16 between the two, disks 21 at the ends of the axle-bearing to close endwise the space forming the oil-chamber, packing and balls between the opposing surfaces of the disks, the first to prevent the escape of oil and the latter to limit the contact between the disks to reduce friction thereat and dust-caps to inclose the axle-bearing.

10. In an improved axle-bearing, the combination of a box 12, a sectional sleeve bored to receive the axle and having tapering ends, disks 14 with collars 15, each collar having a threaded exterior and a smooth interior, the exterior engaging the interior of box 12 and the interior engaging the tapering ends of sleeve 13, thereby holding the latter within box 12, the outside diameter of sleeve 13 being less than the bore of box 12 to form an oil-chamber 16 between the two, disks 21 at the ends of the axle-bearing to close endwise the space forming the oil-chamber, there being a groove in each disk 14, packing-rings 23 therein, a ring 24 by which this packing is supported and backed and springs 25 to hold the packing against the opposite disk.

11. In an improved axle-bearing, the combination of a box 12, a sectional sleeve bored to receive the axle and having tapering ends, disks 14 with collars 15, each collar having a threaded exterior and a smooth interior, the exterior engaging the interior of box 12 and the interior engaging the tapering ends of sleeve 13, thereby holding the latter within box 12, the outside diameter of sleeve 13 being less than the bore of box 12 to form an oil-chamber 16 between the two, disks 21, one at each end of the axle-bearing and outside of disks 14, said disks 21 being adjustably mounted upon the axle, confining between them and determining the position of the hub and antifriction devices between the opposing surfaces of opposite disks.

12. In an improved axle-bearing, the combination of a hub having disks 14 secured to its ends and rotating with it, disks 21 mounted on the axle against the outside of disks 14 and stationary with reference to the latter, balls between the opposing surfaces of opposite disks, being contained in a groove in the side of one of the opposite disks, such groove being of a depth to receive the balls beyond their halves whereby they are prevented from dropping out when the disks are separated, said grooves being further enlarged at one point to permit insertion of the balls one by one and a plate 47 whereby such enlarged space is closed to hold the balls in place.

13. In an improved axle-bearing, the combination with the hub and hub-bands, of lubricating means and a dust-cap 31 to close the space within the hub-band, said cap having its outside shaped to form a nut to permit its manipulation, packing in sections, springs 36 back of the latter to hold the packing out against the hub-band and screws 37 provided for the purpose described.

14. An improved axle-bearing, comprising the axle-journal having screw-threaded portions, a hub mounted on this journal, disks 14 secured to the hub ends, disks 21 mounted on the screw-threaded portions at the ends of the axle-journal and close against disks 14, dust-caps secured within the hub-bands of the hub, lock-nuts mounted on the screw-threaded portions of the axle to hold disks 21 to their position, dust-cap 31 being utilized to serve at the same time as such a lock-nut at one end of the hub.

In testimony whereof I hereunto set my signature in presence of two witnesses.

ANDREW J. THEIRING.

Witnesses:
C. SPENGEL,
ARTHUR KLINE.